US010439440B2

(12) United States Patent
Kottas et al.

(10) Patent No.: US 10,439,440 B2
(45) Date of Patent: Oct. 8, 2019

(54) CHARGER AND METHOD OF INDUCTIVELY CHARGING A MOBILE DEVICE INSIDE A MOTOR VEHICLE

(71) Applicant: Lisa Draexlmaier GmbH, Vilsbiburg (DE)

(72) Inventors: Hugo Kottas, Vilsbiburg (DE); Christopher Trautwein, Muehldorf am Inn (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 15/827,080

(22) Filed: Nov. 30, 2017

(65) Prior Publication Data

US 2018/0159379 A1   Jun. 7, 2018

(30) Foreign Application Priority Data

Dec. 1, 2016   (DE) .................. 10 2016 123 268

(51) Int. Cl.
- *H02J 50/12* (2016.01)
- *H02M 7/48* (2007.01)
- *H02M 3/335* (2006.01)
- *H02J 7/02* (2016.01)

(52) U.S. Cl.
CPC ............ *H02J 50/12* (2016.02); *H02J 7/025* (2013.01); *H02M 3/335* (2013.01); *H02M 7/48* (2013.01)

(58) Field of Classification Search
CPC ...................................... H02J 7/025
USPC ....................................... 320/108
See application file for complete search history.

(56) References Cited

U.S. PATENT DOCUMENTS

| 4,404,472 A * | 9/1983 | Steigerwald | G05F 1/67 136/293 |
| 2010/0194369 A1* | 8/2010 | Nagai | H02M 3/156 323/284 |
| 2012/0139357 A1* | 6/2012 | Teggatz | H02J 5/005 307/104 |

(Continued)

FOREIGN PATENT DOCUMENTS

| CN | 103326475 | 9/2013 |
| EP | 2158711 | 3/2016 |

(Continued)

OTHER PUBLICATIONS

Office Action regarding Chinese Patent Application No. 201711233925. 0, dated Sep. 12, 2018.

*Primary Examiner* — Richard Isla
*Assistant Examiner* — Johali A Torres Ruiz
(74) *Attorney, Agent, or Firm* — Burris Law, PLLC

(57) ABSTRACT

The present disclosure introduces a charger for inductively charging a mobile device inside a motor vehicle. The charger includes a power source configured to supply electrical energy in the form of DC voltage, a transmitter coil for inductively transferring power to the mobile device, a signal generator configured to generate a sinusoidal signal, and an output stage that is coupled to the power source, the transmitter coil and the signal generator. The output stage is configured to receive the sinusoidal signal as a control signal and to supply to the transmitter coil a current flow, corresponding to the control signal, of the energy provided by the power source.

13 Claims, 3 Drawing Sheets

(56) References Cited

U.S. PATENT DOCUMENTS

| | | | |
|---|---|---|---|
| 2013/0241304 A1* | 9/2013 | Bae | H04B 5/0037 307/104 |
| 2014/0132077 A1* | 5/2014 | Nalbant | H02M 1/38 307/104 |
| 2014/0239732 A1 | 8/2014 | Mach et al. | |
| 2015/0280422 A1 | 10/2015 | Harvey et al. | |
| 2016/0301236 A1 | 10/2016 | Krishnamurthi et al. | |
| 2017/0237296 A1* | 8/2017 | Keith | H02J 7/0042 307/104 |

FOREIGN PATENT DOCUMENTS

| | | |
|---|---|---|
| WO | 2003/105338 | 12/2003 |
| WO | 2015/177657 | 11/2015 |

\* cited by examiner

State of the Art

State of the Art

CHARGER AND METHOD OF INDUCTIVELY CHARGING A MOBILE DEVICE INSIDE A MOTOR VEHICLE

CROSS-REFERENCE TO RELATED APPLICATIONS

This application claims priority to and the benefit of German Patent Application No. DE 10 2016 123 268.8 filed on Dec. 1, 2016. The disclosure of the above application is incorporated herein by reference.

FIELD

The present disclosure relates to the field of the wireless transfer of power, particularly inside a motor vehicle. Thus, the present disclosure relates to a charger for inductively charging a mobile device inside a motor vehicle and to a method of inductively charging a mobile device inside a motor vehicle.

BACKGROUND

The statements in this section merely provide background information related to the present disclosure and may not constitute prior art.

Mobile devices have to be charged repeatedly in order to be used. To avoid tediously connecting a charger by plug and socket to do this, systems for wirelessly transferring power are increasingly being used. The alternating inductance between two magnetic coils is utilized here to transfer electrical output through magnetic induction. A distinction is generally made between inductive and resonant systems, with hybrid forms also being available. In an inductive system, a source coil acting as the primary winding of a transformer is fed by a voltage source or a current source. A receiving coil acting as a secondary winding of a transformer is connected directly or through a resonant coupling capacitor to a bridge rectifier. In a resonant system, the source and receiving coils are coupled to capacitors to form electrical oscillating circuits, so that a portion of the reactive impedance of the coils is canceled. This ultimately results in such systems being optimized onto a narrow frequency band in which the electric power is transferred.

Since the charger and the mobile device to be charged must be tuned to one another, various standards have established themselves in the field of the wireless transfer of power. The Qi standard issued by the Wireless Power Consortium (WPC) is usually classified as an inductive charging standard. Although a resonant capacitor is used in reference circuits, the quality factor Q lies in the single-digit range; this implies that no resonance is effectively used. The electrical power here is transferred in a frequency range of 88 Hz-205 Hz. In the automotive environment, it is not beneficial to actuate the output stage before the transfer coil by means of a square-wave signal, as this leads to a high electromagnetic radiation/noise emissions and/or electromagnetic incompatibility. Especially in the vicinity of sensitive vehicle modules such as radio, ABS, and automatic pilot, this situation can only be alleviated with expensive shielding measures in the vehicle and surrounding the charger.

Chargers for inductively charging battery-operated mobile devices inside a motor vehicle are described, for example, in US 2016/0301236 A1, US 2014/0239732 A1 or WO 2015/177657 A1.

SUMMARY

The present disclosure provides a wireless transfer of power that alleviates the challenges described above, and to do so using the simplest possible constructional arrangement.

In one form, the present disclosure provides a charger with the features of the independent claims. Advantageous further developments of the present disclosure are specified in the dependent claims, the description and the accompanying drawings.

A charger according to the present disclosure for inductively charging a mobile device inside a motor vehicle comprises a power source, a transmitter coil, a signal generator and an output stage that suitably connects the power source, the transmitter coil and the signal generator to one another. The power source is designed to supply a DC voltage. Thus, a power source may be understood to be a battery, a generator with a DC voltage converter or an interface for connecting a DC voltage. The transmitter coil is configured to inductively transfer electric power to the mobile device. The signal generator is configured to generate a sinusoidal signal and to supply it at the control input of the output stage. The output stage has a control input, a power input and a power output. The power input of the output stage is electrically coupled to the power source, and the power output is electrically coupled to the transmitter coil. The output stage is configured to receive the sinusoidal signal of the signal generator at the control input, to convert the applied DC voltage in accordance with the control signal and to provide a corresponding current flow via the power output of the transmitter coil.

The transferred power of the inductive charger occurs through closed-loop control of the amplitude of the sinusoidal signal that serves as the control signal. Therefore, the signal generator includes level-adjustment means arranged between the signal generator and the control input. The level-adjustment device is also referred to as a level control device or level control. As a closed-loop control device, the level-adjustment device may also include a controller input for specifying a setpoint value and feedback input for reading in an actual value. The actual value here is detected by a measuring device for measuring current. The measuring device is also referred to as a current measuring device. The measuring device is arranged and configured between a collector terminal of the output stage and a pole of the power source or chassis ground, and it is designed to measure current supplied as the actual value by the power source.

In other words, an inductive charger is created in which a sinusoidal signal is generated and applied to actuate the output stage. Thus, for example, in the automotive sector, including the field of automotive passenger compartments, near sensitive vehicle modules such as a radio or ABS, smartphones configured in conformity with the Qi standard of the Wireless Power Consortium are charged with optimized electromagnetic compatibility. Valid norms and regulations of the automobile industry are advantageously observed for this, particularly with reference to the electromagnetic compatibility.

The output stage here may be cost-effectively designed as a half-bridge circuit or a full-bridge circuit. Thus, the output stage may include two or more transistors in a push-pull arrangement. Hence, the output stage may be designed as a push-pull output stage with single-cycle control. The control input of the output stage can thus be connected to base and the two emitters of the transistors can be connected to one another and to the power output. The two collectors of the transistors form the power input. A first collector of the output stage is then electrically connected to the positive pole of the power source and a second collector of the output stage is connected to the negative pole of the power source or to chassis ground.

The two transistors are advantageously comprised of a PNP transistor and an NPN transistor, respectively, which have opposite electrical parameters. In one form of the present disclosure, the collector of the NPN transistor is electrically coupled to the positive pole of the power source and the collector of the PNP transistor is connected to the negative pole of the power source or to chassis ground.

Depending on the form, the signal generator is realized in different ways. For instance it may be designed as an LC generator, an RC generator, a phase-locked loop generator (PLL) or square-wave generator followed by a low-pass filter. Hence, the signal generator can be adapted to a circuit to create a high-quality and at the same time inexpensive solution.

In one variant, the transmitter coil is designed as a printed conductor(s) on a printed circuit board, whereby a very low-cost design of a corresponding charger can be achieved. In addition, the form of the winding can be adapted easily by a coil that is integrated into a printed circuit board. Some examples include an essentially rectangular or square shape of the windings, or any other polygon (e.g., triangle, pentagon, octagon).

For series production, a major portion of the charger can be inexpensively realized in an ASIC. In combination with a coil imprinted on a PCB, chargers can be produced in this way that are very compact but high performing and at the same time low-cost, while meeting the demands made regarding electromagnetic compatibility in automotive applications.

A method for inductively charging a mobile device inside a motor vehicle includes at least the steps of providing, generating and transferring. In the providing step electrical energy in the form of DC voltage is supplied available by a power source. In the generating step a signal generator generates a sinusoidal signal as a control signal, which is used in the transferring step to inductively transfer the electrical energy by means of an output stage and a transmitter coil to the mobile device in the form of a current flow corresponding to the control signal.

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
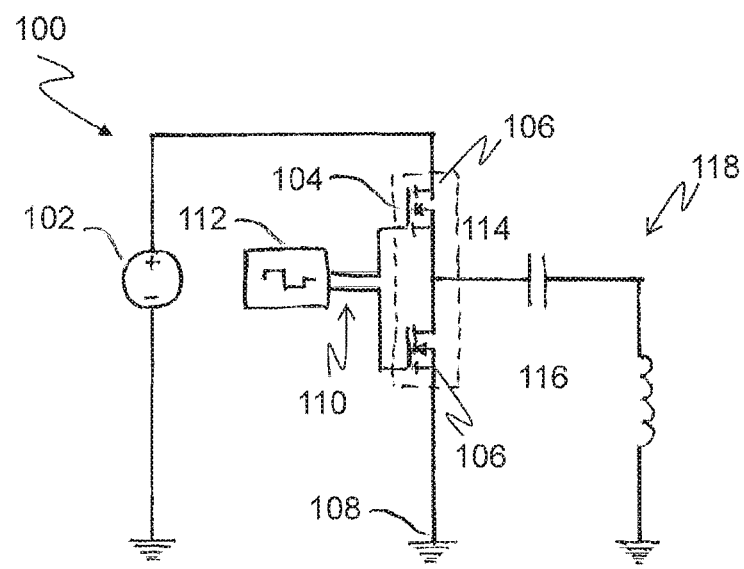
FIG. 1 shows a circuit diagram of a reference design for an inductive charger according to the prior art following a Qi standard.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The drawings are merely schematic representations and serve only to explain the present disclosure. The same or similar elements are provided throughout with the same reference numbers.

FIG. 1 shows a circuit diagram of a reference design for an inductive charger 100 according to the prior art following the Qi standard. The circuit is comprised of a DC voltage source 102 that supplies power for the output stage 104. The output stage 104 comprises a half-bridge or a full-bridge and is realized with MOSFETs 106. Alternately switching the MOSFETs 106 on and off causes the resonant oscillating circuit to be applied alternately to the positive supply voltage or to the negative supply voltage or chassis ground 108. The alternating switching of the MOSFETs 106 is carried out by the applied square-wave signal 110, which is emitted by a microcontroller 112. The microcontroller 112 functions as a square-wave signal generator 112. The input energy in the series oscillating circuit 118 causes oscillations between the capacitor 114 and the coil 116 and leads to the transfer of power to the secondary circuit through the transmitter coil 116.

The direct actuation of the output stage 104 by means of a square-wave signal 110 leads to a very steep rise in voltage and current ("current increase" is attenuated by the inductance), resulting in an increased grid-bound and electromagnetic noise emission. Due to the high quality factor in the series oscillating circuit 118, near resonant frequency high voltages occur at the capacitor 114. Depending on how the circuit is configured, this can reach values far above 100 V. For a safe layout of the circuit a large number of NPO capacitors 114 with high dielectric strength is desired. As a consequence the costs of the circuit may increase.

In order to use a variant of the circuit shown in FIG. 1 in the automotive environment, expensive measures such as an aluminum housing would be desired to shield the circuit. In addition, a voltage regulator would be desired, but that lowers the efficiency.

In other words, the basic structure of the output stage 104 includes a half-bridge or full-bridge realized with MOSFETs 106. For transferring power a series resonant oscillating circuit 118 made up of the transmitter coil 116 and a capacitor 114 is used. The output stage 104 is actuated with a square-wave signal 110.

Figure 2:
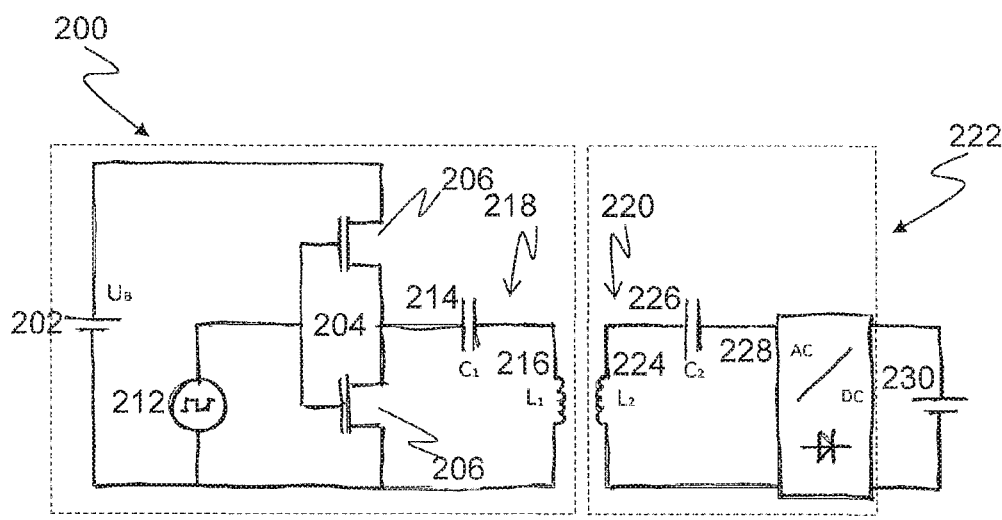
FIG. 2 shows a circuit diagram of another reference design for an inductive charger according to the prior art following a Qi standard.

FIG. 2 shows a circuit diagram of another reference design for an inductive charger 200 according to the prior art following the Qi standard. This can be a variant of the charger 100 shown in FIG. 1. Due to the greater efficiency, two LC oscillating circuits 218, 220 are used, on the primary and secondary sides, respectively. The variant depicted also shows a mobile device 222 in addition to a primary-side oscillating circuit 218 that includes a DC voltage source 202, an output stage 204 with two MOSFETs 206, a square-wave signal generator 212, a capacitor C1 214 and a coil L1 216. Simply stated, the mobile device 222 comprises the secondary-side oscillating circuit 220, which is made up of the secondary-side coil L2 224 and the secondary-side capacitor C2 226, and a DC voltage converter 228 and an accumulator 230 as the load 230.

Advantages of the circuit shown in FIG. 2 reside in the efficiency of the square-wave actuation, low heat and simple wiring.

Figure 3:
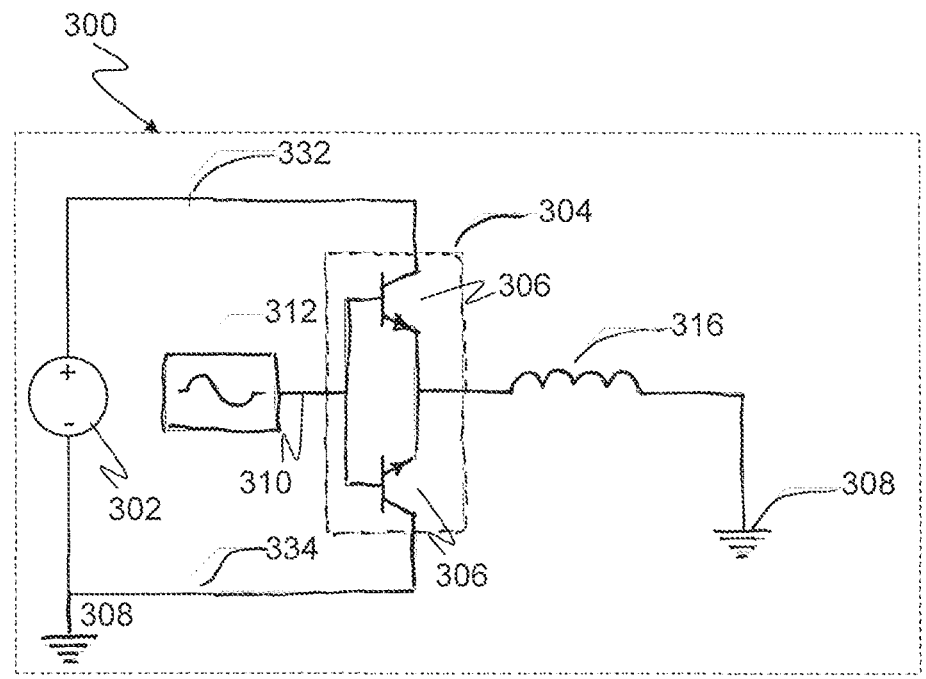
FIG. 3 shows a circuit diagram of an inductive charger according to one form of the present disclosure.

FIG. 3 shows a circuit diagram of an inductive charger 300 according to one form of the present disclosure. The charger 300 includes a power source 302 configured to provide electrical energy in the form of a DC voltage. Furthermore, the charger 300 has an output stage 304 realized with transistors 306 in push-pull circuitry, a signal generator 312 for generating a sinusoidal signal 310 of a specific amplitude and frequency, and a transmitter coil 316 for the transfer of power. An input of the transmitter coil 316 is connected to the output of the output stage 304, and an output of the transmitter coil 316 is connected to chassis ground 308. A positive pole 332 (voltage supply positive) and a negative pole 334 (voltage supply negative or chassis ground 308) are shown for the power source 302.

In other words a sinusoidal signal 310 is generated and used in the inductive charger 300 to actuate the output stage 304. The amplitude of the signal 310 is regulated to enhance and adjust performance. To achieve the best possible efficiency of the system 300, the frequency is adjusted to the particular resonant frequency of the receiver circuit (LC oscillating circuit receiver). The circuit includes an actuator 312 that generates the sinusoidal signal 310 at a specific amplitude and frequency based on the information received. The output stage 304 of the transmitter is actuated by means of the generated signal 310, and thus the coil/inductance 316 is supplied with a sinusoidal current flow from the power source 302 (332, 334). The resulting magnetic field of the coil 316 is sinusoidal in shape. The signal is optimally set or regulated during the transfer of power by a continuous exchange of information between the transmitter and the receiver or by voltage/current measurement of the sinusoidal signal in the load circuit.

Some features that have proved to be advantageous are: good electromagnetic compatibility (EMV); far lower noise emissions compared to the circuit shown in FIG. 2, since no steep voltage flanks are used compared to the square-wave actuation; simple amplitude regulation; no voltage regulator; no NPO capacitors; no demand on the quality of the coil; and the possibility of integrating known standard circuits.

The inductive charger 300 shown in FIG. 3 has a number of advantages over the one shown in FIG. 2, as already mentioned above. Since the transmitter is not designed as an oscillating circuit, but rather, its frequency is controlled directly via the signal generator 312, the resonant frequency is easily adaptable to the receiver. Also, in the transmitter there is no capacitor that is burdened with high voltages in operation at or near resonant frequency.

Figure 4:
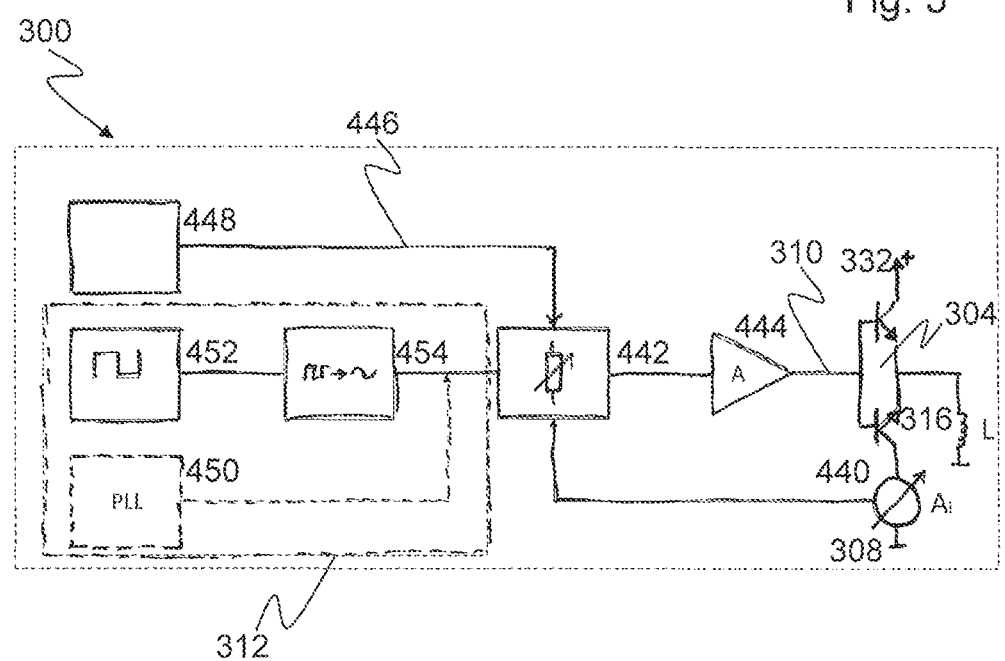
FIG. 4 shows a circuit diagram of an inductive charger according to another form of the present disclosure.

FIG. 4 shows a circuit diagram of an inductive charger 300 according to another form of the present disclosure. According to the disclosure, the output stage is actuated with a sinusoidal signal 310.

The coil 316 is supplied by an output stage 304 designed in the form of a half-bridge/full-bridge amplifier. Thus, the output stage 304 includes two or more transistors in a push-pull circuit. The current through the coil (load current) is measured by a current measuring device 440 or current measuring circuit 440 and serves as the value for setting/regulating the desired power requirement. The output stage 304 is actuated by a level-control device 442 with an amplifier stage 444 connected downstream. The amplifier stage 444 is designed to amplify the output voltage of the controller 442 to the magnitude desired for the output stage 304. If the signal generator is not amplitude-controllable the level-control device 442 has three inputs: sinusoidal signal of the generator 312, output signal of the current measuring device 440 (serves to automatically set the current amplitude/feedback) and reference value 446 of microcontroller 448 for setting the coil current. The generator 312 of the sinusoidal signal 310 may be comprised of the following variants: LC generator, RC generator, phase-locked loop generator 450 (PLL generator 450) or signal output of the microcontroller 452 with downstream low-pass filter 454. The current measurement Ai (by means of current measuring device 440) can take place in the positive (332) or negative (334) branch.

The following advantages result from actuating the transmitter coil 316 with a sinusoidal signal 310:

the generator frequency (450, 452) can be adjusted to resonant frequency of the receiver circuit LC2, i.e. of the mobile device (not shown), whereby enhanced efficiency is achieved;

the sinusoidal actuator does not generate electromagnetic noise emissions;

no primary resonant circuit (LC1—compare FIG. 1 or FIG. 2) is present; thus no capacitor with high dielectric strength is needed;

no primary resonant circuit (LC1—compare FIG. 1 or FIG. 2) is present; thus no demands on quality are made for the coil L1 316;

with closed-loop current control it is possible to charge with great efficiency at enhanced operating frequency (adjusted to resonant frequency of the receiver);

by using simple sinusoidal actuation, it is possible to optimally lay out the coil 316 of the transmitter onto all secondary oscillating circuits LC2, since the secondary oscillating circuit cannot affect the resonant frequency of the (not present) primary oscillating circuit LC1;

since no demands are made on the quality of the coil 316, it may be mounted on a PCB (printed circuit board) instead of the wound coil with high-frequency strand;

by adapting the coil 316 only one step-down converter or none at all is needed;

the wiring is so simple that implementation in an ASIC is improved; and since magnetic field compatibility develops in accordance with Qi specifications, the Qi standard concerning the outer interfaces is met.

To achieve the best possible efficiency of the system 300 the frequency is adjusted to the respective resonant frequency of the receiver circuit (LC oscillating circuit receiver).

In summary, the advantages of the present disclosure, as depicted in FIG. 3 and FIG. 4 as compared to the prior art shown in FIG. 1 and FIG. 2 reside in electromagnetic compatibility (EMV), simple amplitude regulation and integration of standard circuits. A result of this is also that a voltage regulator and expensive NPO capacitors are not necessary and few or no demands are made on the quality of the coil.

Figure 5:
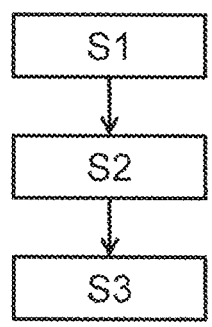
FIG. 5 shows a flowchart of a method for inductively charging in accordance with one form of the present disclosure.

FIG. 5 shows a workflow of a method for inductively charging in accordance with one form of the present disclosure. The method includes the steps of providing S1, generating S2 and transferring S3. In the providing step S1 electric power is supplied as DC voltage by a power source. In the generating step S2 a sinusoidal signal is generated as a control signal by a signal generator. In the transferring step S3 the electrical energy is inductively transferred as a current flow corresponding to the control signal to the mobile device by means of an output stage and a transmitter coil, thereby charging the mobile device by inductive transfer of energy.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A charger for inductively charging a mobile device inside a motor vehicle, the charger comprising:
   a power source configured to supply electrical energy in the form of a DC voltage;
   a transmitter coil for the inductive transfer of power to the mobile device;
   a signal generator configured to generate a sinusoidal signal and to adjust an amplitude of the sinusoidal signal to control transferred electrical energy;
   an output stage that is coupled to the power source, to the transmitter coil and to the signal generator and that is configured to receive the sinusoidal signal as a control signal and to provide a sinusoidal current flow, corresponding to the control signal, of the power supplied by the power source to the transmitter coil;
   a current measuring device arranged between a collector terminal of the output stage and a pole of the power source and configured to measure a current through the transmitter coil and supplied as an actual value by the power source;
   a microcontroller comprising a reference value for setting a transmitter coil current; and
   a level-control device that is arranged between an output of the signal generator, the microcontroller, a control input of the output stage or an input of an amplifier stage connected upstream from the output stage, and an output from the current measuring device such that the level-control device is coupled to the signal generator, the current measuring device and the microcontroller, and receives the sinusoidal signal from the signal generator, the measured current from the current measuring device, and the reference value from the microcontroller.

2. The charger according to claim 1, wherein the output stage is a half-bridge circuit or a full-bridge circuit.

3. The charger according to claim 1, wherein the output stage comprises transistors in push-pull circuitry.

4. The charger according to claim 3, wherein the transistors are an NPN transistor and a PNP transistor having opposite electrical parameters.

5. The charger according to claim 3, wherein the output stage is a push-pull amplifier with single-break control.

6. The charger according to claim 1, wherein the signal generator is at least one of an LC generator, an RC generator, a phase-locked loop generator, and a square-wave generator followed by a low-pass filter.

7. The charger according to claim 1, wherein the level-control device is arranged between the output of the signal generator and the control input of the output stage.

8. The charger according to claim 1, wherein the level-control device is arranged between the output of the signal generator and the input of the amplifier stage.

9. The charger according to claim 1, wherein a first collector terminal of the output stage is electrically coupled to a positive pole of the power source and a second collector terminal of the output stage is electrically coupled to a negative pole of the power source or to chassis ground.

10. The charger according to claim 1, wherein the transmitter coil is a printed coil on a printed circuited board.

11. The charger according to claim 1, wherein the level-control device is arranged between the output of the signal generator, the microcontroller, the input of amplifier stage and the output of the current measuring device.

12. The charger according to claim 11, the amplifier stage amplifies an output voltage from the level-control device.

13. A method for inductively charging a mobile device inside a motor vehicle, the method comprising the following steps:
   providing electrical energy in the form of DC voltage by a power source;
   providing a reference value for setting a transmitter coil current from a microcontroller to a level-control device coupled to the microcontroller;
   generating a sinusoidal signal as a control signal by a signal generator;
   providing the sinusoidal signal to the level control device, wherein an amplitude of the sinusoidal signal is adjusted by the level-control device to control transferred electrical energy;
   amplifying an output voltage from the level-control device with an amplifier stage;
   transferring the electrical energy as a current flow corresponding to the control signal to the mobile device by an output stage and a transmitter coil to charge the mobile device by inductive transfer of energy;
   measuring the electrical energy through the transmitter coil as an actual value; and
   providing the measured electrical energy to the level-control device.

* * * * *